(12) United States Patent
Rozman et al.

(10) Patent No.: US 9,225,225 B2
(45) Date of Patent: Dec. 29, 2015

(54) SENSING PM ELECTRICAL MACHINE POSITION

(71) Applicant: Hamilton Sundstrand Corporation, Charlotte, NC (US)

(72) Inventors: Gregory I. Rozman, Rockford, IL (US); Jacek F. Gieras, Glastonbury, CT (US); Steven J. Moss, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 211 days.

(21) Appl. No.: 13/958,114

(22) Filed: Aug. 2, 2013

(65) Prior Publication Data

US 2015/0035469 A1 Feb. 5, 2015

(51) Int. Cl.
| | |
|---|---|
| *G05B 1/06* | (2006.01) |
| *H02K 11/00* | (2006.01) |
| *H02P 6/16* | (2006.01) |
| *H02P 9/00* | (2006.01) |
| *H02P 6/18* | (2006.01) |

(52) U.S. Cl.
CPC .......... *H02K 11/0031* (2013.01); *H02K 11/001* (2013.01); *H02P 6/16* (2013.01); *H02P 6/183* (2013.01); *H02P 9/009* (2013.01)

(58) Field of Classification Search
CPC ..... H02P 6/185; H02P 2101/30; H02P 21/06; H02P 21/146; H02P 9/08; H02P 9/302; H02P 1/50; H02P 21/0039; H02P 21/0042; H02P 21/085; H02P 21/141; H02P 21/145; H02P 2203/09; H02P 2203/11

USPC ........... 318/400.32, 600, 605, 632, 652, 721; 702/147; 310/68 C; 322/10
See application file for complete search history.

(56) References Cited

U.S. PATENT DOCUMENTS

| | | | | | |
|---|---|---|---|---|---|
| 3,571,687 | A | * | 3/1971 | Larwin .......................... | 318/632 |
| 4,310,790 | A | * | 1/1982 | Mulet-Marquis ............. | 318/608 |
| 4,527,120 | A | * | 7/1985 | Kurosawa ..................... | 324/166 |

(Continued)

FOREIGN PATENT DOCUMENTS

| | | |
|---|---|---|
| EP | 0772025 A1 | 5/1997 |
| EP | 2387145 A2 | 11/2011 |

(Continued)

OTHER PUBLICATIONS

Tursini, M., et al., "Initial Rotor Position Estimation Method for PM Motors", IEEE Transactions on Industry Applications, vol. 39, No. 6, Nov./Dec. 2003.

(Continued)

*Primary Examiner* — Paul Ip
(74) *Attorney, Agent, or Firm* — Locke Lord LLP; Joshua L. Jones; Christopher J. Cillié

(57) ABSTRACT

An electrical machine includes a stator having a stator winding and a secondary transformer coil. A rotor is operatively connected to rotate relative to the stator, wherein the rotor includes a plurality of embedded permanent magnets. A primary transformer coil is wound on the rotor and is operatively connected to form a rotating transformer with the secondary transformer coil. An inverter/active rectifier component is operatively connected to the stator winding and the secondary transformer coil to control the stator winding based on a sense in the secondary transformer coil received from the primary transformer coil.

15 Claims, 6 Drawing Sheets

(56) References Cited

U.S. PATENT DOCUMENTS

| | | | |
|---|---|---|---|
| 5,329,195 A | 7/1994 | Horber et al. | |
| 5,493,201 A * | 2/1996 | Baker | 322/10 |
| 5,512,813 A * | 4/1996 | Uchinami | 322/28 |
| 5,594,322 A * | 1/1997 | Rozman et al. | 322/10 |
| 5,710,509 A * | 1/1998 | Goto et al. | 324/207.25 |
| 5,719,487 A * | 2/1998 | Sato et al. | 322/28 |
| 5,780,995 A * | 7/1998 | Maggioni et al. | 322/8 |
| 5,796,236 A * | 8/1998 | Royak | 318/804 |
| 5,869,945 A * | 2/1999 | Ha et al. | 318/600 |
| 5,898,287 A * | 4/1999 | Roberti et al. | 318/605 |
| 6,069,467 A * | 5/2000 | Jansen | 318/802 |
| 6,111,390 A * | 8/2000 | Inaba et al. | 322/28 |
| 6,160,384 A * | 12/2000 | Inaba et al. | 322/59 |
| 6,218,749 B1 * | 4/2001 | Nondahl et al. | 310/68 C |
| 6,504,275 B2 * | 1/2003 | Nondahl et al. | 310/68 B |
| 6,636,012 B2 * | 10/2003 | Royak et al. | 318/727 |
| 7,072,790 B2 * | 7/2006 | Hu et al. | 702/147 |
| 7,513,169 B2 * | 4/2009 | Noritou | 73/862.326 |
| 7,990,090 B2 * | 8/2011 | Vilain et al. | 318/400.32 |
| 8,866,449 B1 * | 10/2014 | Rozman et al. | 322/46 |
| 2001/0008352 A1 * | 7/2001 | Nondahl et al. | 310/68 C |
| 2003/0033103 A1 * | 2/2003 | Goto et al. | 702/94 |
| 2006/0052972 A1 * | 3/2006 | Hu et al. | 702/147 |
| 2007/0251332 A1 * | 11/2007 | Noritou | 73/862.326 |
| 2011/0115424 A1 * | 5/2011 | Vilain et al. | 318/721 |

FOREIGN PATENT DOCUMENTS

| | | |
|---|---|---|
| EP | 2819298 A2 | 12/2014 |
| WO | WO-9964825 A1 | 12/1999 |

OTHER PUBLICATIONS

Search Report and Opinion issued by the European Patent Office on Jun. 12, 2015 for European Patent Application No. 14178530.

* cited by examiner

SENSING PM ELECTRICAL MACHINE POSITION

BACKGROUND OF THE INVENTION

1. Field of the Invention

The present disclosure relates to electrical machines such as motors and generators, and more particularly to angular position and velocity estimation of permanent magnet (PM) synchronous machines.

2. Description of Related Art

PM machines can be classified based on the flux distribution or back-electromagnetic force (EMF) waveform as square-wave brushless DC machines (BLDCM) and sine-wave or synchronous machines (PMSM). The BLDCM utilizes a trapezoidal back-EMF waveform supplied by rectangular current waveforms with conduction duration of 120°. The commutation is based on the rotor position with 60° resolution typically provided by Hall sensors. The PMSM utilizes sinusoidal back-EMF supplied by sinusoidal current waveforms properly phased with respect to the back-EMF. The rotor position information is typically provided by resolvers or encoders.

Most of sensorless motor controllers utilize position estimation techniques for both BLDCM and PMSM using back-EMF. The initial rotor position information at standstill is not available using back-EMF methods. The possible initial starting methods can be classified based on the following:

Starting from predetermined rotor position established by proper feeding;

Open-loop start up; and

Estimation of the rotor position at zero speed based on state observers utilizing machine parameters. See, M. Tursini, R. Petrella, F. Parasiliti, "Initial Rotor Position Estimation Method for PM Motors", IEEE Transactions On Industry Applications, Vol. 39, No. 6, November/December 2003, pp. 1630-1640, which is incorporated by reference herein in its entirety.

The above techniques may not guarantee good accuracy in rotor position estimation at zero and low speed. A combination method utilizes a resolver at zero and low speed and a sensorless algorithm based on extended rotor flux at medium and high speed. See U.S. Pat. No. 7,072,790 to Hu et al., which is incorporated by reference herein in its entirety. The reason to use sensorless algorithms at medium and high speed is to reduce negative effects of non-ideal resolver characteristics such as an amplitude imbalance, imperfect quadrature, and inductive harmonics on the current controller and motoring torque.

U.S. Pat. No. 5,329,195 to Horber et al., which is incorporated by reference herein in its entirety, describes utilizing a PM motor with the stator pole elements wound with two coils. One coil on each pole element includes a sensor winding, and the other includes a power winding. As a result, all pole elements of the stator are utilized both to produce rotor drive torque and also to generate electrical signals that provide accurate rotor position information. This approach is useful for small size PM machines because of elimination of a somewhat similar sized resolver. However, for the larger size PM machines this approach considerably penalizes the power density of the machine, and, therefore, may not be attractive in applications such as aerospace or ground vehicles.

Such conventional methods and systems have generally been considered satisfactory for their intended purpose. However, there is still a need in the art for systems and methods that allow for improved performance such as reliability, complexity, and cost. There also remains a need in the art for such systems and methods that are easy to make and use. The present disclosure provides a solution for these problems.

SUMMARY OF THE INVENTION

An electrical machine includes a stator having a stator winding and a secondary transformer coil. A rotor is operatively connected to rotate relative to the stator, wherein the rotor includes a plurality of embedded permanent magnets. A primary transformer coil is wound on the rotor and is operatively connected to form a rotating transformer with the secondary transformer coil. An inverter/active rectifier component is operatively connected to the stator winding and the secondary transformer coil to control the stator winding based on a sense signal in the secondary transformer coil received from the primary transformer coil.

In certain embodiments, a rotor position detector is operatively connected between the inverter/active rectifier component and the secondary transformer coil to receive first and second injection signals from the inverter/active rectifier component, to obtain a sense signal at the secondary transformer coil, and to output at least one of rotor speed and rotor position to the inverter/active rectifier component. A second coil, e.g., a sense coil, can be connected in parallel with the transformer primary coil. The inverter/active rectifier component can be configured to direct external power through the stator to drive the rotor in a motoring mode and to deliver power from the stator to an external DC load in a generate mode.

In certain embodiments, the inverter/active rectifier component includes a position and velocity decoder configured and adapted to receive a sense signal from the secondary transformer coil and to output position and velocity feedback signals. A proportional and integral regulator can be included, with a first switch for switching between a velocity reference input for the motoring mode and a DC voltage reference for the generate mode, and a second switch for switching between the velocity feedback in the motoring mode and a DC voltage feedback input in the generate mode. The proportional and integral regulator can be configured to output a quadrature current reference signal (Iq) and a direct current reference signal (Id) in both the motoring and generate modes. A field oriented control can be operatively connected to receive the reference signals from the proportional and integral regulator, the position feedback from the position and velocity decoder, and inverter current signals and to output first and second stationary reference frame command signals. An injection quadrature generator can be operatively connected to an AC power source to inject a first injection signal into an adder for outputting the sum of the first injection signal and the first stationary reference frame command signal and to inject a second injection signal into an adder for outputting the sum of the second injection signal and the second stationary reference frame command signal.

In another aspect, the position and velocity decoder can include a synchronous filter operatively connected to receive the sense signal from the secondary transformer coil as well as to receive the first and second injection signals from the injection quadrature generator, and to output a filtered sense signal. The position and velocity decoder can also include a position/velocity estimator operatively connected to receive the filtered sense signal from the synchronous filter and to receive the first injection signal from the injection quadrature generator and to output the position and velocity feedback signals.

In accordance with certain embodiments, the position/velocity estimator includes a first zero cross detector operatively connected to receive the first injection signal and to output a reset signal to a counter. A clock can be operatively connected to provide a timing signal to the free-running counter. For example, the output of the counter can contain timing information, and the counter can be reset to zero by the leading, e.g., falling, edge of the signal at the output of a zero-cross detector in response to the polarity of the first stationary reference frame command signal. A second zero cross detector can be operatively connected to receive the filtered sense signal and to output a latch signal. A latch component can be operatively connected to receive the latch signal and to output the position feedback signal. The timing information at the output of the counter can be stored in the latch register at the falling, e.g., leading, edge of the signal at the output of a zero-cross detector in response to the polarity of the filtered sense signal. The latch register can contain the time difference between polarity change of the reference and sense signals. This time difference is proportional to the rotor position. A differentiator can be operatively connected to receive the position feedback signal and to output the velocity feedback signal.

A method of controlling an electrical machine includes receiving a sense signal with a secondary transformer coil of an electrical machine as described above. The method also includes estimating position and velocity of the rotor based on the sense signal, and using estimated position and velocity of the rotor to control the electrical machine. Estimating position and velocity can include estimating position and velocity based on first and second injection signals.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
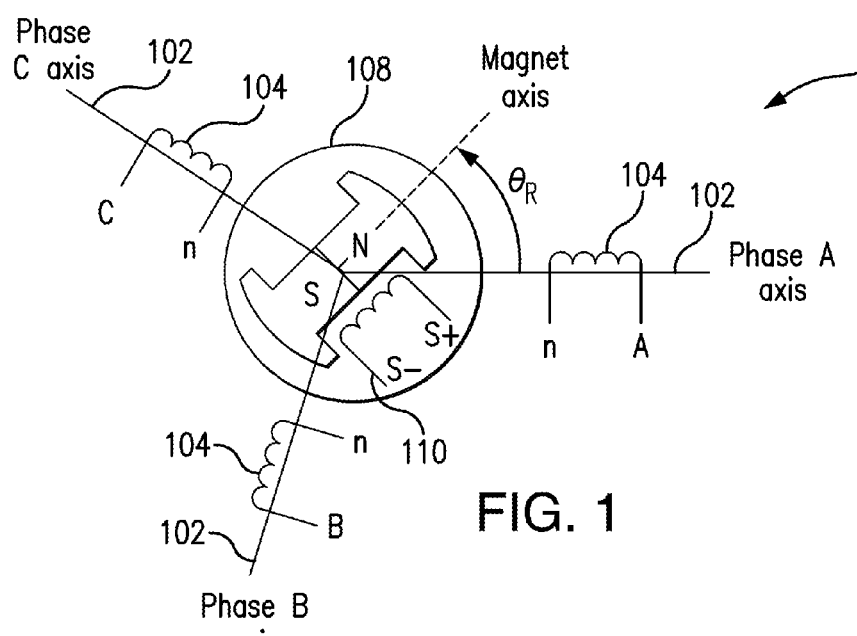
FIG. 1 is a schematic view of an exemplary embodiment of a sensor PM electrical machine, showing the primary transformer coil of the rotor.
Figure 2:
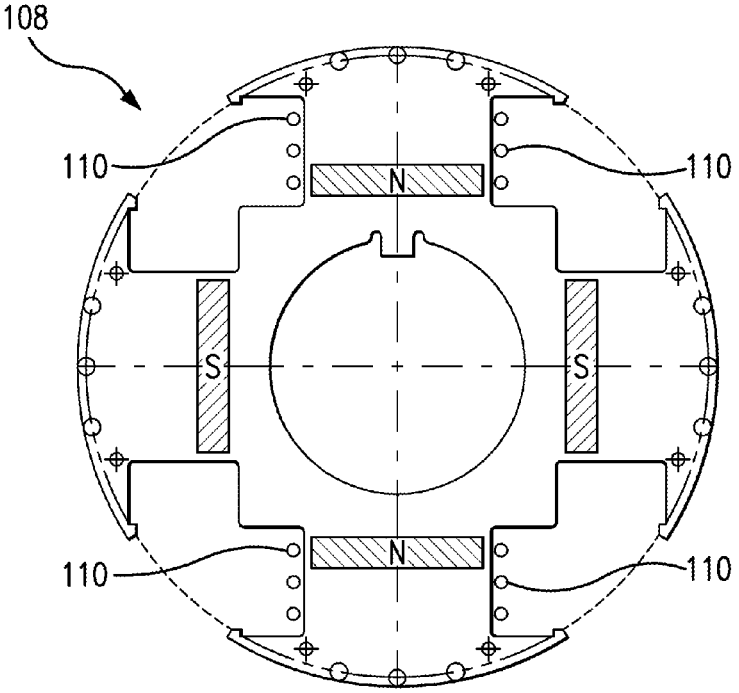
FIG. 2 is a schematic end elevation view of the rotor of FIG. 1, showing the primary transformer coils and embedded magnets.

Reference will now be made to the drawings wherein like reference numerals identify similar structural features or aspects of the subject disclosure. For purposes of explanation and illustration, and not limitation, a partial view of an exemplary embodiment of an electrical machine is shown in FIG. 1 and is designated generally by reference character 100. Other embodiments of electrical machines, or aspects thereof, are provided in FIGS. 2-7, as will be described. The systems and methods disclosed herein can be used, for example, to completely eliminate the resolver as a position sensor for electric engine start and active rectification commutation to improve system reliability, complexity, and cost without necessarily reducing power density.

Figure 3:
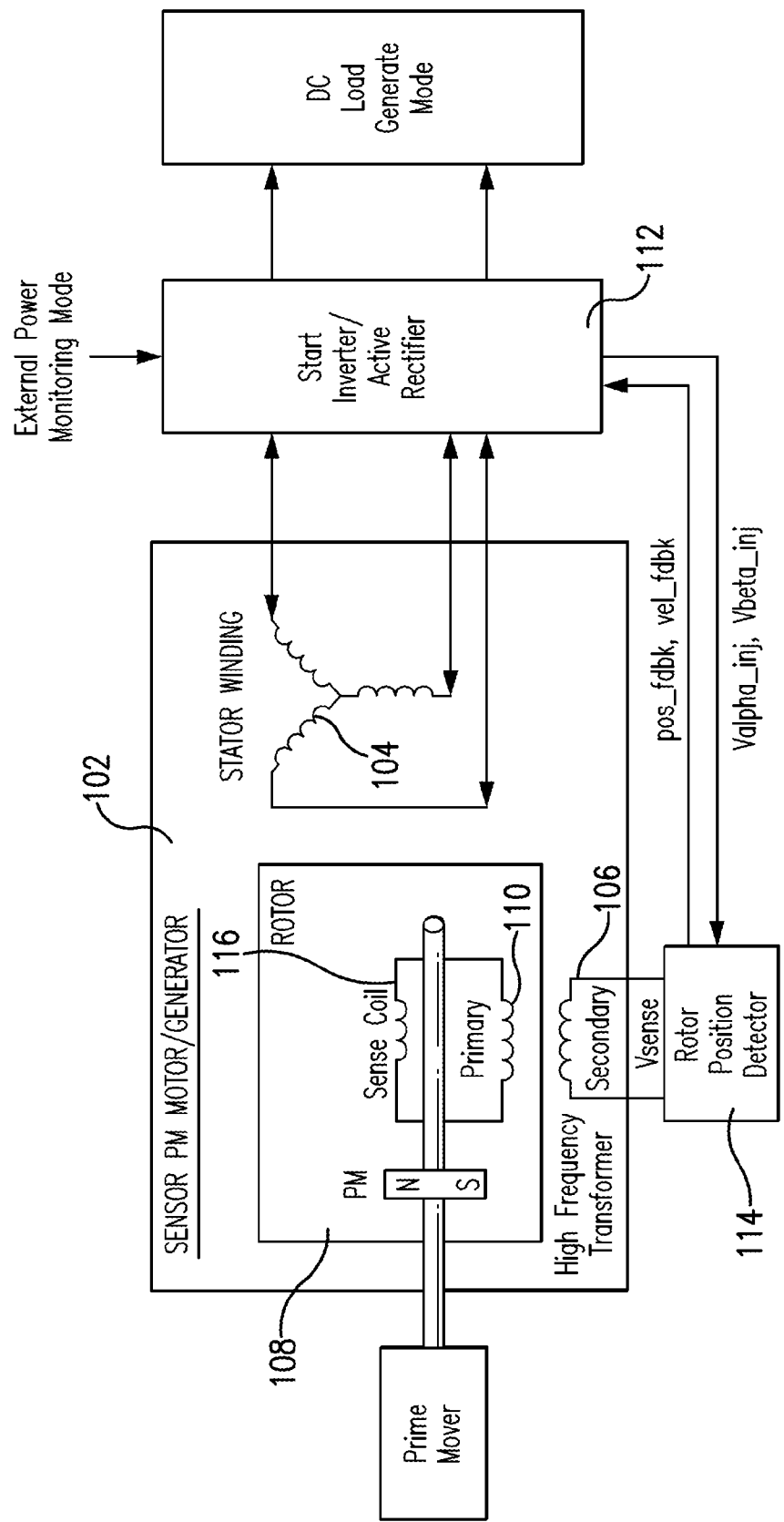
FIG. 3 is a block diagram of an exemplary embodiment of a system for controlling the electrical machine of FIG. 1 in a motoring mode and in a generate mode, schematically showing the rotor, stator winding, and an primary and secondary transformer coils as well as the inverter/active rectifier component.

FIG. 1 is a sensor PM electrical machine diagram showing a sense winding wired around two or more rotor poles. The excitation coil is a primary winding of a single phase high frequency rotating transformer (HFRT). Electrical machine 100 is a sensor PM electrical machine that uses a sensor winding to provide a feedback after signal processing for motor/generator control. Electrical machine 100 includes a stator 102 including stator windings 104 and a secondary transformer coil 106, which is shown in FIG. 3. A rotor 108 is operatively connected to rotate relative to stator 102. Rotor 108 includes a plurality of embedded permanent magnets indicated schematically in FIG. 2. A sense coil 110 is wound on rotor 108 and is operatively connected as a primary transformer coil to form a rotating transformer with secondary transformer coil 106. The exemplary configuration in FIG. 2 has a four-pole rotor construction with two sense coils 110 and 116.

With reference now to FIG. 3, a block diagram of an electric engine start/dc power generating system is shown. The sense coils 110 receive a high frequency signal injected by a power converter, e.g., inverter/active rectifier component 112, into the PM machine armature windings, e.g., stator windings 104. The power converter, inverter/active rectifier component 112, may operate as a motor drive inverter or as an active rectifier. Inverter/active rectifier component 112 is operatively connected to stator winding 104 and secondary transformer coil 106 to control stator winding 104 based on output in secondary transformer coil 106 received from sense coil 110. Inverter/active rectifier component 112 is connected to direct external power through stator 102 to drive rotor 108 in a motoring mode and to deliver power from stator 102 to an external DC load in a generate mode.

A rotor position detector 114 is operatively connected between inverter/active rectifier component 112 and secondary transformer coil 106 to receive first and second injection signals from inverter/active rectifier component 112, to receive a sense signal at secondary transformer coil 106, and to output at least one of rotor speed and rotor position to inverter/active rectifier component 112. Sense coil 116 is connected in parallel with sense coil 110.

Figure 4:
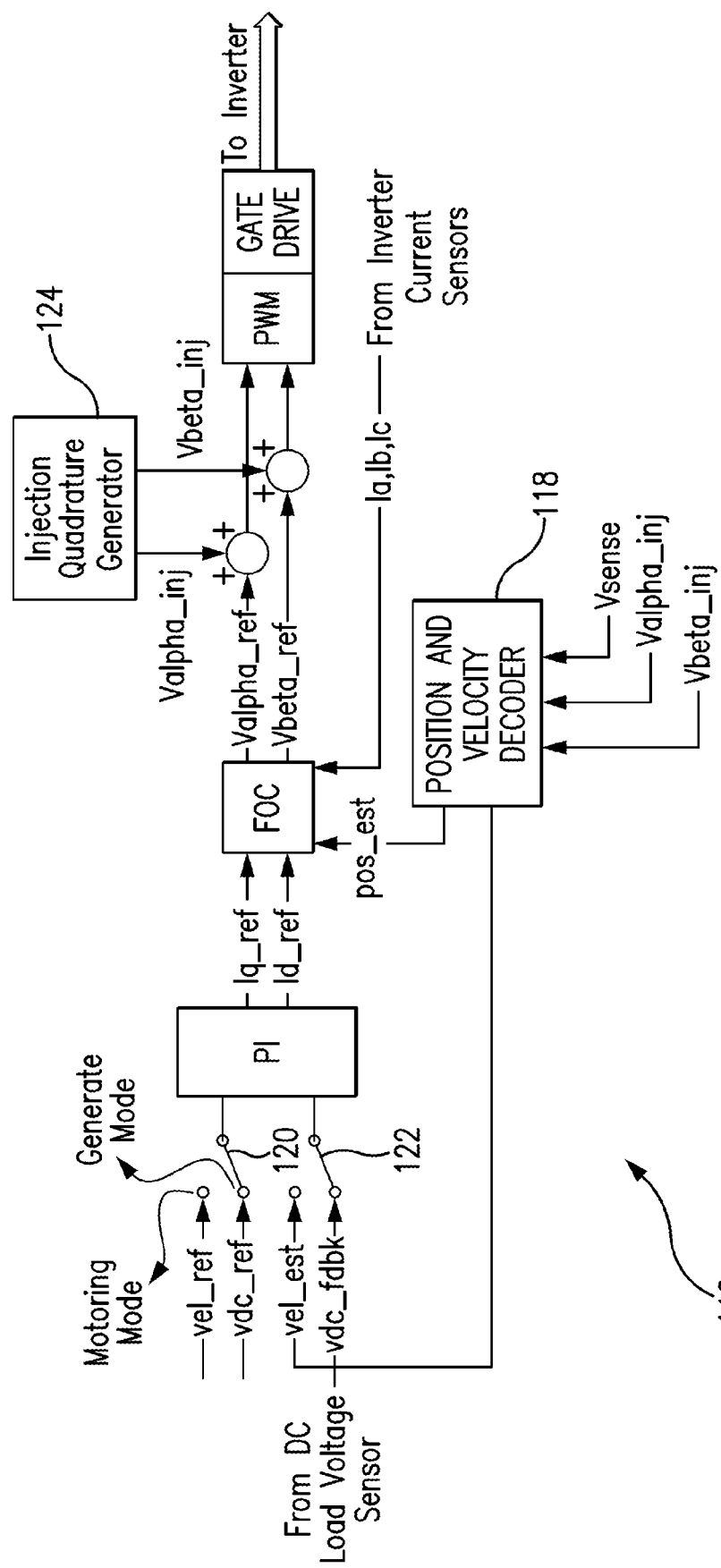
FIG. 4 is a block diagram of an exemplary embodiment of the inverter/active rectifier component of FIG. 3, showing the inputs and outputs for use determining rotor position and velocity for the motoring and generate modes, and also showing the position and velocity decoder.

Referring now to FIG. 4, a high level block diagram of an electric engine start controller is shown, which includes a speed control function using a field-oriented controller (FOC) to control motor torque in coordination with estimated rotor position. Inverter/active rectifier component 112 includes a position and velocity decoder 118 connected to receive the sense signal, Vsense in FIG. 4, from secondary transformer coil 106 and to output position and velocity feedback signals, designated pos_est and vel_est in FIG. 4, respectively. A proportional and integral regulator, designated PI in FIG. 4, is included with a first switch 120 for switching between a velocity reference input, vel_ref, for the motoring mode and a DC voltage reference, vdc_ref, for a generate mode. The PI also has a second switch 122 for switching between the velocity feedback, vel_est, in the motoring mode and a DC voltage feedback input, vdc_fdbk, in the generate mode. The PI is configured to output a quadrature current reference signal, designated Iq_ref in FIG. 4, and a direct current reference signal, Id_ref in FIG. 4, in both the motoring and generate modes. A field oriented control (FOC) is operatively connected to receive the reference signals from the PI, the position feedback from position and velocity decoder 118, and inverter current signals $I_a$, $I_b$, and $I_c$ and to output first and second stationary reference frame command signals designated Valpha_ref and Vbeta_ref, respectively, in FIG. 4. An injection quadrature generator 124 injects a first injection signal, Valpha_inj into an adder for outputting the sum of the first injection signal and the first stationary reference frame command signal. Injection quadrature generator 124 is also connected to inject a second injection signal, Vbeta_inj, into an adder for outputting the sum of the second injection signal and the second stationary reference frame command signal. The PWM converter shown in FIG. 4 operates as an engine start inverter during motoring mode and as an active rectifier during the generate mode.

Figure 5:
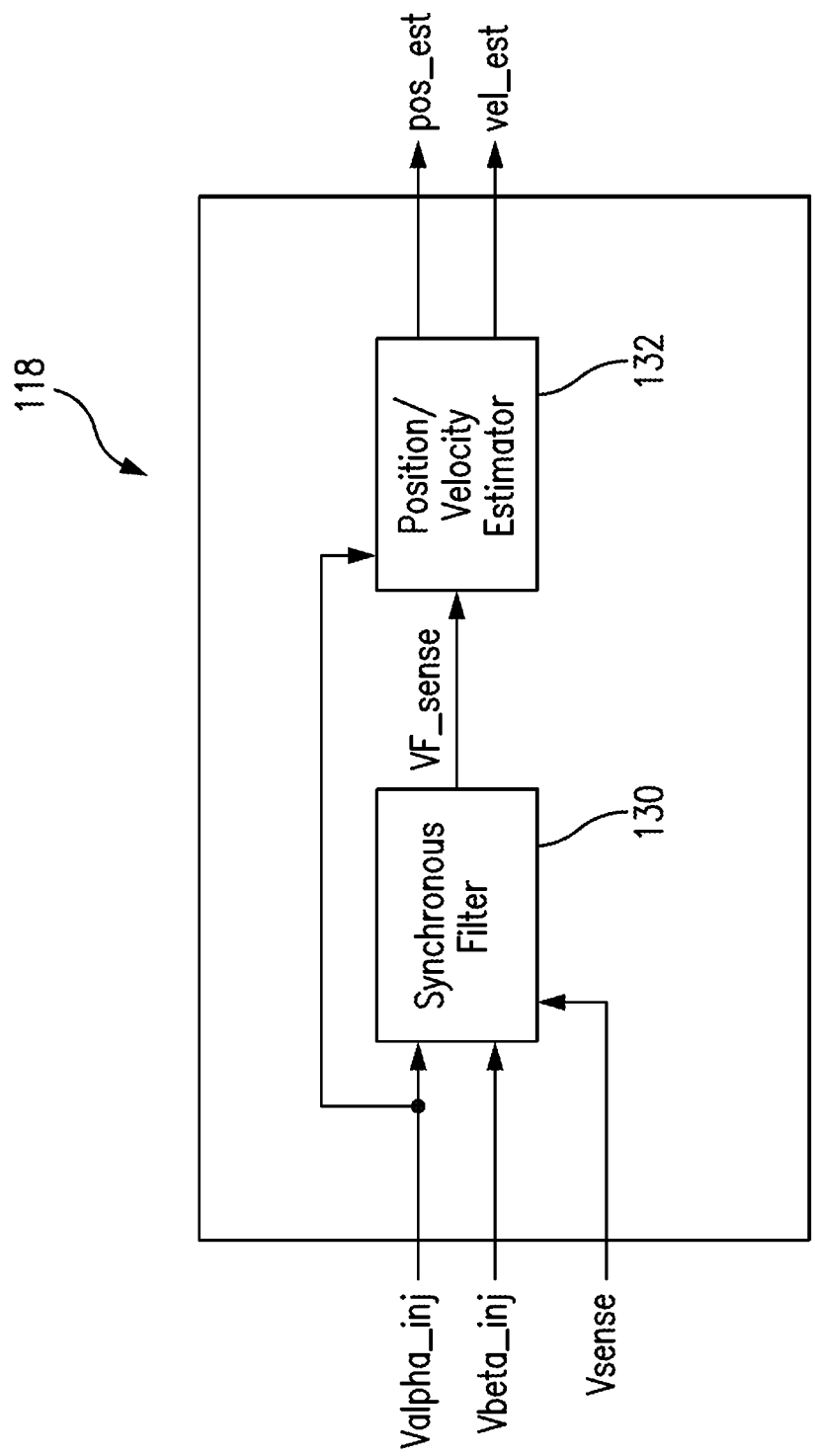
FIG. 5 is a block diagram of an exemplary embodiment of the position and velocity decoder of FIG. 4, showing the synchronous filter and the position/velocity estimator.

Referring now to FIG. 5, position and velocity decoder 118 includes a synchronous filter 130 operatively connected to receive the sense signal, Vsense, from secondary transformer coil 106 as well as to receive the first and second injection signals, Valpha_inj and Vbeta_inj, from injection quadrature generator 124 in FIG. 4, and to output a filtered sense signal, VF_sense in FIG. 5 to a position/velocity estimator 132. Position/velocity estimator 132 is also connected to receive the first injection signal, Valpha_inj, and to output the position and velocity feedback, labeled pos_est and vel_est in FIG. 5, which are also shown in FIG. 4.

Figure 6:
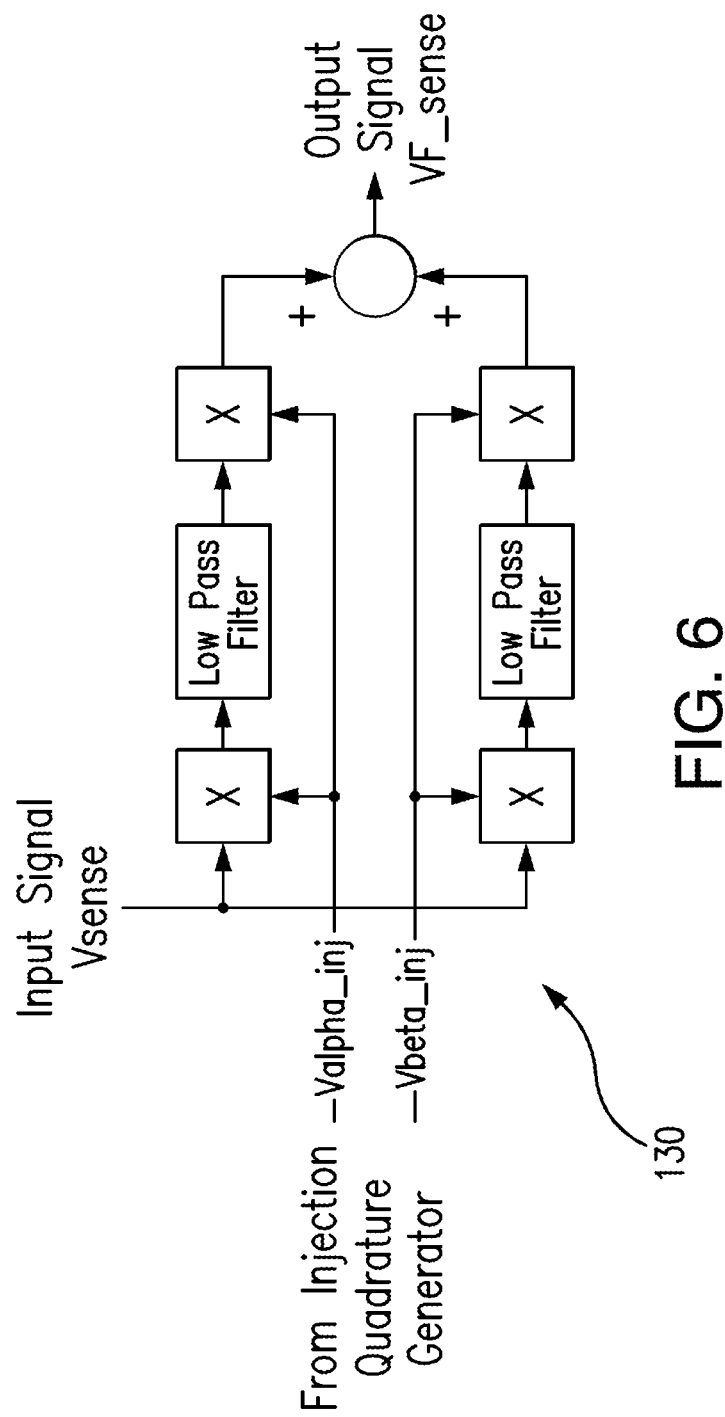
FIG. 6 is a block diagram of an exemplary embodiment of the synchronous filter shown in FIG. 5.
Figure 7:
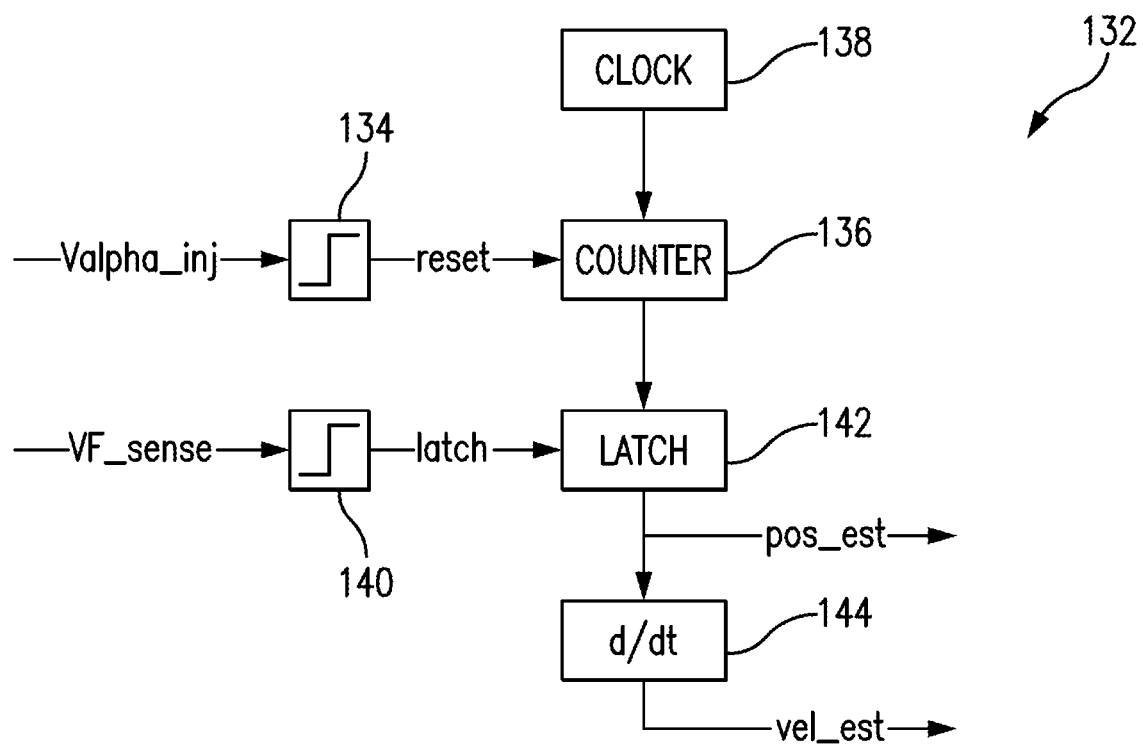
FIG. 7 is a block diagram of an exemplary embodiment of a position/velocity estimator shown in FIG. 5.

Details of a synchronous filter implementation and signal processing for position and velocity estimation are shown in FIGS. 6 and 7. Additional details can be found in U.S. Pat. No. 7,072,790 which is incorporated by reference above. Referring to FIG. 6, a block diagram of synchronous filter 130 is shown. Synchronous filter 130 selects voltage component Vsense that contains rotor position information and is synchronized with the signals Valpha_inj and Vbeta_inj from the injection quadrature generator.

With reference to FIG. 7, a block diagram of the position/velocity estimator 132 of FIG. 5 is shown which illustrates signal processing to estimate rotor position from zero to high generator speed. Position/velocity estimator 132 includes a first zero cross detector 134 operatively connected to receive the first injection signal, Valpha_inj, and to output a reset signal to counter 136. A clock 138 is operatively connected to provide a timing signal to free-running counter 136. The output of the counter contains timing information. The counter is reset to zero by the leading, e.g., falling, edge of the signal at the output of a zero-cross detector in response to polarity of the reference signal Valpha_ref. A second zero cross detector 140 is operatively connected to receive the filtered sense signal, VF_sense, and to output a latch signal. A latch component 142 is operatively connected to receive the latch signal and to output the position feedback signal, pos_est, as indicated in FIGS. 5 and 7. The timing information at the output of the counter is stored in the latch register at the falling, e.g., leading, edge of the signal at the output of a zero-cross detector in response to polarity of the VF_sense signal. The latch register contains the time difference between polarity change of the reference and sense signals. This time difference is proportional to rotor position. A differentiator 144 is operatively connected to receive the position feedback signal, pos_est, and to output the velocity feedback signal, vel_est, as indicated in FIGS. 5 and 7.

A method of controlling an electrical machine, e.g., electrical machine 100, includes receiving a sense signal with a secondary transformer coil of an electrical machine as described above. The method also includes estimating position and velocity of the rotor based on the sense signal, and using estimated position and velocity of the rotor to control the electrical machine. This can be done using an inverter/active rectifier component, e.g., inverter/active rectifier component 112 described above.

Using estimated position and velocity of the rotor to control the electrical machine can include controlling rotor toque in a motoring mode and controlling DC voltage at the output of the active rectifier in a generate mode. Estimating position and velocity can include estimating position and velocity based on first and second injection signals, e.g., as produced by injection quadrature generator 124.

The methods and systems described herein offer potential benefits including improved system performance and reliability when operating as an active rectifier due to improved position sensing accuracy. Additional potential benefits include improved system complexity and cost, improved system power density, and potential reduction in size of power semiconductors when used as an electric engine start due to improved accuracy in rotor position sensing. While shown and described in the exemplary context of a starter/dc power generating system, those skilled in the art will readily appreciate that such applications are exemplary only, ant that any other suitable applications can be used without departing from the scope of this disclosure.

The methods and systems of the present disclosure, as described above and shown in the drawings, provide for electrical machine systems and methods with superior properties including, for example, improved system reliability, complexity, and cost without necessarily reducing power density. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An electrical machine system, comprising:
   a stator including a stator winding and a secondary transformer coil;
   a rotor operatively connected to rotate relative to the stator, wherein the rotor includes a plurality of embedded permanent magnets;
   a primary transformer coil wound on the rotor and operatively connected to form a rotating transformer with the secondary transformer coil; and
   an inverter/active rectifier component operatively connected to the stator winding and the secondary transformer coil to control the stator winding based on a sense signal in the secondary transformer coil received from the primary transformer coil,
   wherein the inverter/active rectifier component includes a field oriented control, an adder, a pulse width modulator, and an injection quadrature generator,
   wherein the field oriented control is connected to the secondary transformer coil to receive the sense signal and generate a reference signal, wherein the adder is connected to both the field oriented control and the injection quadrature generator for outputting a sum of the reference signal and an injection signal from the injection quadrature generator to the pulse width modulator.

2. An electrical machine system as recited in claim 1, further comprising a rotor position detector operatively connected between the inverter/active rectifier component and the secondary transformer coil to receive first and second injection signals from the inverter/active rectifier component, to receive a sense signal at the secondary transformer coil, and to output at least one of rotor speed and rotor position to the inverter/active rectifier component.

3. An electrical machine system as recited in claim 1, further comprising a sense coil connected in parallel with the transformer primary coil.

4. An electrical machine system as recited in claim 1, wherein the inverter/active rectifier component is configured to direct external power through the stator to drive the rotor in a motoring mode and to deliver power from the stator to an external DC load in a generate mode.

5. An electrical machine system as recited in claim 4, wherein the inverter/active rectifier component includes:
   a position and velocity decoder configured and adapted to receive a sense signal from the secondary transformer coil and to output position and velocity feedback signals; and
   a proportional and integral regulator with a first switch for switching between a velocity reference input for the motoring mode and a DC voltage reference for the generate mode, and a second switch for switching between the velocity feedback in the motoring mode and a DC voltage feedback input in the generate mode, wherein the proportional and integral regulator is configured to output a quadrature current reference signal and a direct current reference signal in both the motoring and generate modes
   wherein the field oriented control operatively connected to receive the reference signals from the proportional and integral regulator, the position feedback from the position and velocity decoder, and inverter current signals and to output first and second stationary reference frame command signals.

6. An electrical machine system as recited in claim 5, wherein the injection quadrature generator is operatively connected to inject a first injection signal into the adder for outputting the sum of the first injection signal and the first stationary reference frame command signal and to inject a second injection signal into the adder for outputting the sum of the second injection signal and the second stationary reference frame command signal.

7. An electrical machine system as recited in claim 6, wherein the position and velocity decoder includes:
   a synchronous filter operatively connected to receive the sense signal from the secondary transformer coil as well as to receive the first and second injection signals from the injection quadrature generator, and to output a filtered sense signal; and
   a position/velocity estimator operatively connected to receive the filtered sense signal from the synchronous filter and to receive the first injection signal from the injection quadrature generator and to output the position and velocity feedback signals.

8. An electrical machine system as recited in claim 7, wherein the position/velocity estimator includes:
   a first zero cross detector operatively connected to receive the first injection signal and to output a reset signal to a counter;
   a clock operatively connected to provide a timing signal to the counter;
   a second zero cross detector operatively connected to receive the filtered sense signal and to output a latch signal;
   a latch component operatively connected to receive the latch signal and to output the position feedback signal; and
   a differentiator operatively connected to receive the position feedback signal and to output the velocity feedback signal.

9. An inverter/active rectifier component for directing external power through an electrical machine stator to drive a rotor in a motoring mode and to deliver power from the stator to an external DC load in a generate mode, the inverter/active rectifier component comprising:
   a position and velocity decoder configured and adapted to receive a sense signal and to output position and velocity feedback signals;
   a proportional and integral regulator with a first switch for switching between a velocity reference input for the motoring mode and a DC voltage reference for a generate mode, and a second switch for switching between the velocity feedback in the motoring mode and a DC voltage feedback input in the generate mode, wherein the proportional and integral regulator is configured to output a quadrature current reference signal and a direct current reference signal in both the motoring and generate modes;
   a field oriented control operatively connected to receive the reference signals from the proportional and integral regulator, the position feedback from the position and velocity decoder, and inverter current signals and to output first and second stationary reference frame command signals; and
   an adder connected to both the field oriented control and an injection quadrature generator for outputting a sum of the first and second stationary reference frame command signals and an injection signal from the injection quadrature generator.

10. An inverter/active rectifier component as recited in claim 9, further comprising an injection quadrature generator operatively connected to inject a first injection signal into an adder for outputting the sum of the first injection signal and the first stationary reference frame command signal and to inject a second injection signal into an adder for outputting the sum of the second injection signal and the second stationary reference frame command signal.

11. An inverter/active rectifier as recited in claim 9, wherein the position velocity decoder includes:
   a synchronous filter operatively connected to receive the sense signal as well as to receive the first and second injection signals from the injection quadrature generator, and to output a filtered sense signal; and
   a position/velocity estimator operatively connected to receive the filtered sense signal from the synchronous filter and to receive the first injection signal from the injection quadrature generator and to output the position and velocity feedback signals.

12. An inverter/active rectifier as recited in claim 11, wherein the position/velocity estimator includes:
   a first zero cross detector operatively connected to receive the first injection signal and to output a reset signal to a counter;

a clock operatively connected to provide a timing signal to the counter;

a second zero cross detector operatively connected to receive the filtered sense signal and to output a latch signal;

a latch component operatively connected to receive the latch signal and to output the position feedback signal; and a differentiator operatively connected to receive the position feedback signal and to output the velocity feedback signal.

13. A method of controlling an electrical machine comprising:

receiving a sense signal with a secondary transformer coil of an electrical machine;

estimating position and velocity of the rotor based on the sense signal; and using estimated position and velocity of the rotor to control the electrical machine by adding, in an adder, first and second injection signals received from an injection quadrature generator to first and second stationary reference command signals received from a field oriented controller.

14. A method as recited in claim 13, wherein using estimated position and velocity of the rotor to control the electrical machine includes controlling rotor toque in a motoring mode and controlling DC voltage at the output of an active rectifier in a generate mode.

15. A method as recited in claim 13, wherein estimating position and velocity includes estimating position and velocity based on the first and second injection signals by providing an output of the adder to a pulse width modulator operating an engine start inverter during a motoring mode and as an active rectifier during a generate mode.

\* \* \* \* \*